No. 784,394. Patented March 7, 1905.

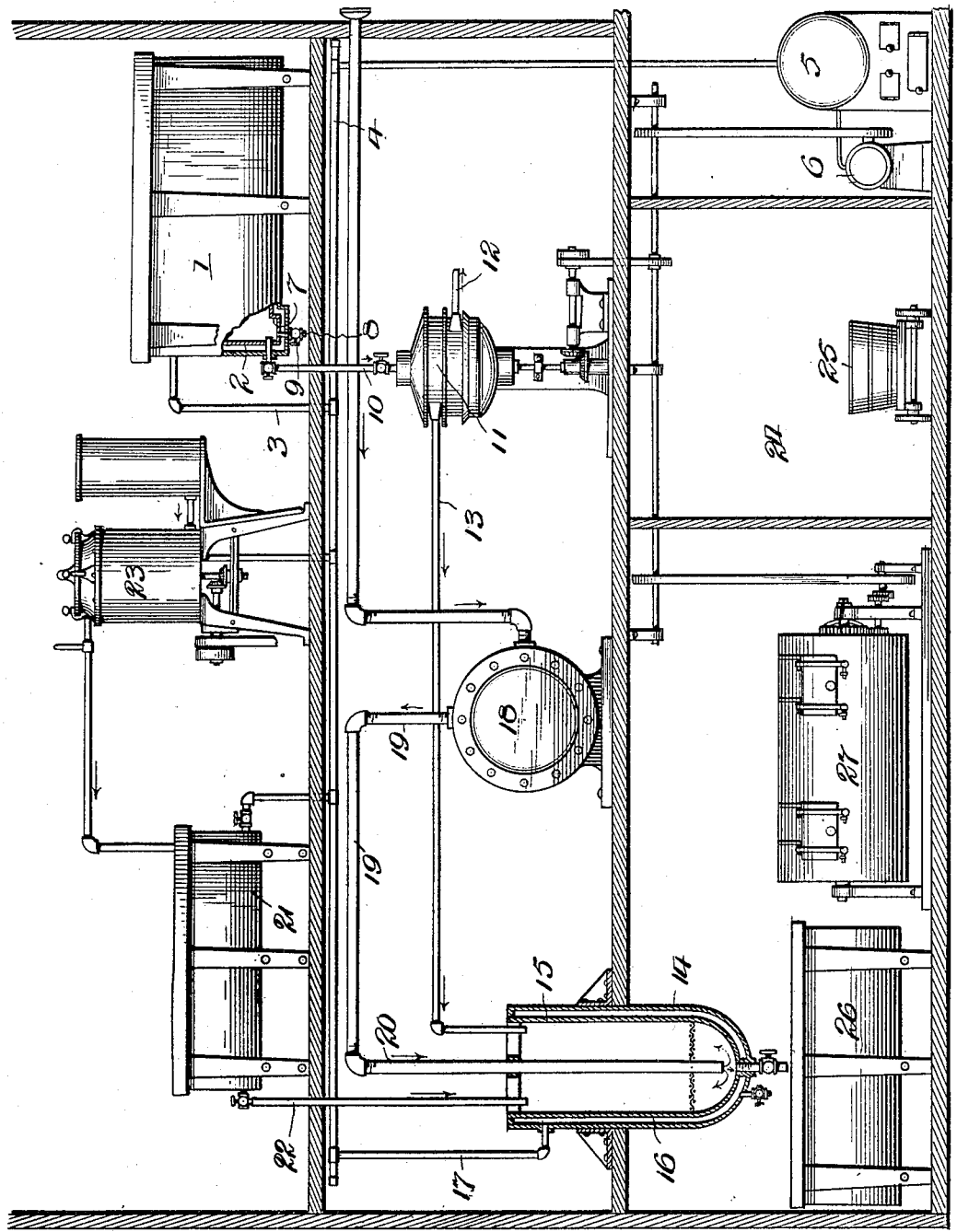

UNITED STATES PATENT OFFICE.

MARK H. GREELEY, OF OTTUMWA, IOWA.

PROCESS OF REFINING BUTTER.

SPECIFICATION forming part of Letters Patent No. 784,394, dated March 7, 1905.

Application filed November 15, 1904. Serial No. 232,845.

*To all whom it may concern:*

Be it known that I, MARK H. GREELEY, a citizen of the United States, residing at Ottumwa, in the county of Wapello and State of Iowa, have invented certain new and useful Improvements in Processes of Refining Butter; and I do hereby declare the following to be a full, clear, and exact description of the invention, such as will enable others skilled in the art to which it appertains to make and use the same.

My invention relates to a refining process for butter-making; and it consists of certain novel features of combination of steps necessary to produce a complete process for treating conglomerate butter and producing therefrom a sweet, healthful, and in every way attractive variety of butter which will grade as the highest.

In carrying out my improved refining process for making butter certain mechanism or appliances of novel construction will be employed, as will be hereinafter clearly set forth, reference being had to the accompanying drawings, in which I have shown a sectional view of a building provided with my butter-making appliances, each in substantially their operative and coöperating positions.

In order to conveniently refer to the details of my invention, the various appliances and parts thereof and coöperating accessories will be designated by numerals, and, referring to the numerals on the drawing, 1 indicates what I shall term my "melting-tank," which, as will be observed, is provided with a false bottom and side walls (designated by the numeral 2) and also provided with an outer wall, which walls are sufficiently separated to provide between them a space of adequate size to be filled with water at the boiling-point, introduced therein in any preferred way, as by the steam-pipe 3, connecting with the steam-supply pipe 4, leading directly to the boiler 5 of the engine 6, said parts being of the usual or any preferred construction and preferably located on the first floor of the building.

It will be observed that the tank 1 is provided at one end with a depression or recess, (indicated by the numeral 7,) and coöperating with this depression or recess is a discharge-pipe 8, leading to any desired point, and a suitable valve 9, whereby the foreign substances—as salt, water, buttermilk, curd, &c.—may be withdrawn. The melting-tank 1 is also provided with a discharging-pipe 10, leading directly into the separator 11, having a discharging-pipe 12 for conveying away any foreign substances which may remain in the melted oil from the tank 1, while the melted oil from the separator 11 is conveyed through the pipe 13 into the aerated chamber or receptacle 14, which is also formed with double walls, the inner wall being designated by the numeral 15, thus leaving between said walls a chamber 16, into which heated water or steam may be introduced through the steam-pipe 4, connecting with the depending branch 17. I also provide a blower (indicated by the numeral 18) which brings in pure air from the outside of the building, preferably strained through the meshes of cloth or otherwise freed from dust, and delivers the air thus obtained by means of the pipes 19 and 20 into the bottom of the receptacle 14, thus causing the air to bubble up through the contents of the receptacle 14 and thoroughly enliven and aerate the same together with the pasteurized or otherwise purified milk delivered from the cooling-tank 21 into said receptacle 14, by means of the pipe 22.

The cooling-tank, as will be observed, is placed in connection with the milk pasteurizer or purifier 23, in which the milk is thoroughly sterilized by boiling. I have also provided at any convenient point in the building a cooling-room 24 and also provided a portable tank 25, by which at the proper point the butter material may be drawn into the cooling-room and left for a certain period, as will be hereinafter referred to.

It will thus be seen that I have provided a complete coöperating system of tanks and mechanism for treating the rancid butter, together with the addition of any fats or oils which it is desired shall be used in connection therewith, and with said assembled devices or a plant of the character described the operation of producing a refined article of food of high grade may be stated to be as follows:

The butter material is placed within the tank 1 and the temperature of the contents raised to, say, 130°, it being understood that the contents shall be continuously stirred, so as not to turn to oil while melting. It will be found that the material will be completely melted at about 100° temperature. When at 110° or 115° of temperature, the material should be thoroughly skimmed. While at the proper degree of temperature, the settlings, together with the water, &c., should be drawn off through the valve 9 and delivered into any suitable receptacle through the pipe 8. After thus skimming the contents and withdrawing from the bottom of the tank the water and other foreign substances that which remains in the tank will be clear oil, which may be readily delivered into the separator 11 by means of the pipe 10, and the oil should be run through the separator at a temperature of, say, 90°, from whence the pure oil will be delivered through the pipe 13 into the blowing or aerating tank 14, it being understood that the temperature of the aerating-tank 14 shall be 130° or thereabout. It will be understood, however, that pure milk of proper temperature shall also be introduced into the aerating-chamber 14 simultaneously with the introduction of the pure oil, and this I am enabled to accomplish by means of the milk-cooling tank 21 and the pipe connection 22.

It will be understood that before introducing the milk into the tank 21 it shall have been thoroughly purified, as the addition of pure milk is perhaps the most important step in the process of making pure refined butter, for the purer the milk the higher quality of the product.

In preparing the milk for my process butter it should be conveyed through the pasteurizer or purifier 23, which brings the temperature of the milk up to 180° to 200°, and after reaching this temperature the purified milk is conveyed into the cooling-tank 21 and the temperature reduced down to 60° or 65° as quickly as possible and in any preferred way. After reducing the temperature of the milk to 60° or 65° the temperature is again slowly raised to, say, 80°, and the milk at this temperature will in a few hours become slightly sour or acid, and the operator should wait only until the turning-point comes from sweet to sour and not until "whey" is formed, as the time of turning from sweet to sour is the proper time to use the contents of the tank 21, when it is delivered into the aerated tank 14, together with the oil from the separator 11, as before explained. While the oil from the tank 1 before it passes into the separator 11 is substantially pure oil, as before stated, yet any remaining impurities are removed and nothing but clear oil passed through the pipe 13 into the aerated chamber 14, and this clear oil, refined and purified in the manner above stated, is brought into intimate contact with the purified milk, and every globule of the oil is thoroughly acted upon by the milk and becomes permeated with the milk flavor, and the result is that when the oil globules have been again gathered together a sweet-smelling and refined butter is the result. After the contents of the tank 14 have thus been thoroughly commingled said contents are delivered into the cooling-tank 26, where it is thoroughly chilled and crystallized, from whence the butter is taken and placed in the portable tank 25 and left in the cooling-chamber 24, where it is permitted to remain for about eighteen hours until properly tempered or ripened, when it is removed from the portable tank 25 and placed into the butter-worker 27 of the usual or any preferred construction and is therein properly salted, as desired.

It will thus be seen that I have described my complete process of refining butter and producing from an undesirable grade of butter and sterilized milk a most desirable grade of pure sweet butter, and believing that the advantages and manner of carrying out my improved process of producing a refined quality of butter have thus been made clearly apparent further description is deemed unnecessary.

What I claim as new, and desire to secure by Letters Patent, is—

The herein-described process of producing a pure, refined quality of butter, consisting, first in raising the temperature of the butter material to 110° to 115°, more or less, and keeping the contents thoroughly agitated while the temperature is thus being raised, then drawing off the settlings as water, salt, &c. and skimming the heated mass; then drawing off the oil and passing it through a separator at a temperature of 90°; then passing the same into an aerated chamber, having an air-pipe leading to the bottom thereof and simultaneously introducing into said tank with the introduction of the purified oil a greater quantity of pasteurized or otherwise purified milk whereby the air introduced into the aerated chamber will cause a thorough commingling of the purified milk and oil, the temperature of the aerated chamber being maintained at 130° and then drawing off the commingled pure milk and oil into a carrying-vat and thence removing the butter from the cooling-vat and permitting it to stand in the cooling-chamber for eighteen hours and thereafter working and salting the butter all substantially as specified and for the purpose set forth.

In testimony whereof I have signed my name to this specification in the presence of two subscribing witnesses.

MARK H. GREELEY.

Witnesses:
 J. J. SMITH,
 MOSS DORR.